US012333657B2

(12) United States Patent
Paulson et al.

(10) Patent No.: US 12,333,657 B2
(45) Date of Patent: Jun. 17, 2025

(54) BUILDING DATA PLATFORM WITH AUGMENTED REALITY BASED DIGITAL TWINS

(71) Applicant: Tyco Fire & Security GmbH, Neuhausen am Rheinfall (CH)

(72) Inventors: Erik S. Paulson, Madison, WI (US); Brian S. Otto, Menomonee Falls, WI (US); Todd Leister, Milwaukee, WI (US); Aureliu Maxim, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 102 days.

(21) Appl. No.: 18/072,525

(22) Filed: Nov. 30, 2022

(65) Prior Publication Data

US 2023/0169738 A1 Jun. 1, 2023

Related U.S. Application Data

(60) Provisional application No. 63/285,077, filed on Dec. 1, 2021.

(51) Int. Cl.
G06T 19/00 (2011.01)
(52) U.S. Cl.
CPC .................. G06T 19/006 (2013.01)
(58) Field of Classification Search
CPC .................................................. G06T 19/00
See application file for complete search history.

(56) References Cited

U.S. PATENT DOCUMENTS

| 5,301,109 A | 4/1994 | Landauer et al. |
| 5,446,677 A | 8/1995 | Jensen et al. |
| 5,581,478 A | 12/1996 | Cruse et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

U.S. Appl. No. 17/566,029, PassiveLogic, Inc.

(Continued)

Primary Examiner — Matthew Salvucci
(74) Attorney, Agent, or Firm — Foley & Lardner LLP

(57) ABSTRACT

A system can operate to receive an indication of a point in a space of an environment, wherein an augmented reality system is located in the space of the environment at a coordinate in a first coordinate system. The system can operate to query a digital twin for a coordinate of the point in a second coordinate system, the digital twin including a contextual description of the environment. The system can operate to translate the coordinate of the augmented reality system in the first coordinate system to a coordinate of the augmented reality system in the second coordinate system based on the coordinate of the point in the second coordinate system and the coordinate of the augmented reality system in the first coordinate system. The system can operate to generate data to cause the augmented reality system to display information based at least in part on the translation.

20 Claims, 7 Drawing Sheets

(56) References Cited

U.S. PATENT DOCUMENTS

| | | |
|---|---|---|
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,342,928 B2 | 5/2016 | Rasane et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,445,933 B2 | 10/2019 | Rasane et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,013 B2 | 12/2020 | Rasane et al. |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,430,193 B1 * | 8/2022 | Smith .................... G06T 15/08 |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |

(56) References Cited

U.S. PATENT DOCUMENTS

| | | |
|---|---|---|
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |

(56) References Cited

U.S. PATENT DOCUMENTS

| | | |
|---|---|---|
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0256097 A1* | 9/2017 | Finn .................. G06F 30/20 |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0104522 A1* | 4/2020 | Collart .................. G06T 19/20 |
| 2020/0133978 A1 | 4/2020 | Ramamurti et al. |
| 2020/0226156 A1 | 7/2020 | Borra et al. |
| 2020/0285203 A1 | 9/2020 | Thakur et al. |
| 2020/0304375 A1* | 9/2020 | Chennai ................ G06V 20/10 |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0200171 A1 | 7/2021 | Sridharan et al. |
| 2021/0200174 A1 | 7/2021 | Sridharan et al. |
| 2021/0200713 A1 | 7/2021 | Sridharan et al. |
| 2021/0313075 A1 | 10/2021 | Mc Namara et al. |
| 2021/0325070 A1 | 10/2021 | Endel et al. |
| 2021/0342961 A1 | 11/2021 | Winter et al. |
| 2021/0373509 A1 | 12/2021 | Borah et al. |
| 2021/0373510 A1 | 12/2021 | Borah et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0004671 A1 | 1/2022 | Zechlin |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |

(56) References Cited

FOREIGN PATENT DOCUMENTS

| | | |
|---|---|---|
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/567,275, PassiveLogic, Inc.
U.S. Appl. No. 17/722,115, PassiveLogic, Inc.
Apple, "Introducing RoomPlan," retrieved from https://developer.apple.com/augmented-reality/roomplan/ on Aug. 11, 2022, 3 pages (2022).
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Baron, "Avideh Zakhor: the brains behind Google Earth and Street View," The Mercury News, retrieved from http://web.archive.org/web/20170522075837/https:/www.mercurynews.com/2017/05/18/avideh-zakhor-inventor-of-google-street-view/ on Aug. 11, 2022, 6 pages (2017).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Canvas, "Capture spaces in 3D with an iPad or iPhone," retrieved from https://canvas.io/ on Aug. 11, 2022, 12 pages (2022).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv- 01796, IPR2023-00022 (documents filed Jan. 26, 2023-Oct. 7, 2022), and IPR2023-00085 (documents filed Jan. 26, 2023-Oct. 7, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023, Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 22), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Everypoint, Homepage, retrieved from https://everypoint.io/ on Aug. 11, 2022, 9 pages (2022).
Extended European Search Report on EP Application No. 18196948.6 dated Apr. 10, 2019 (9 pages).
Field, T., Tweet from @nobbis on Nov. 19, 2021, retrieved from https://twitter.com/nobbis/status/1461819440241131524 on Aug. 11, 2022, 2 pages (2021).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. 12/776,159, filed May 7, 2010 (722 pages).
Final Conference Program, ACM BuildSys 2016, Stanford, CA, USA, Nov. 15-17, 2016 (7 pages).
Francoeur, B., "5 Types of Building Management Software (and Which One You Should Use)," AkitaBox, retrieved from https://home.akitabox.com/blog/building-management-softwaretypes/ on Aug. 11, 2022, 12 pages (2022).
Gao et al., "A large-scale evaluation of automated metadata inference approaches on sensors from air handling units," Advanced Engineering Informatics, 2018, 37 (pp. 14-30).
Geo Week News Staff, "Indoor Reality wants to revolutionize interior 3D capture," Geo Week News, retrieved from https://www.

(56) References Cited

OTHER PUBLICATIONS geoweeknews.com/news/indoor-reality-wants-make-indoor-3d-capture-easy-possible on Aug. 11, 2022, 11 pages (2018).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hilti, "2019 Company Report," Hilti Corporation, retrieved from https://www.hilti.group/content/dam/documents/Media-Release/2020/march20/Hilti_Company_Report_2019_en.pdf on Aug. 9, 2022, 46 pages (2020).
Hilti, "BIM Equipment and Services—End-to-End Construction Workflow," retrieved from https://www.hilti.group/content/hilti/CP/XX/en/services/engineering/bim-equipment-and-services.html on Aug. 11, 2022, 16 pages (2022).
Hu, S et al., "Building performance optimisation: A hybrid architecture for the integration of contextual information and time-series data," Automation in Construction, 2016, 70 (pp. 51-61).
Indoor Reality, "Product Overview," retrieved from http://www.indoorreality.com/#product-overview on Aug. 11, 2022, 9 pages (2017).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Johnson Heating and Cooling, "Mechanical Engineering and Planning," Johnson Heating and Cooling L.L.C., retrieved from http://www.cooljohnson.com/Engineering_and_Planning.html on Aug. 11, 2022, 3 pages (2011).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13- 14, 2019 (4 pages).
Li et al., "Event Stream Processing with Out-of-Order Data Arrival," International Conferences on Distributed Computing Systems, 2007, (8 pages).
Maschmeyer, R., Tweets from @StrangeNative on Jul. 13, 2022, retrieved from https://twitter.com/StrangeNative/status/1547227797793284096 on Aug. 11, 2022, 8 pages (2022).
Matterport Inc., "Matterport Delivers New and Innovative Solutions for the Built World with AWS," Yahoo! Finance, retrieved from https://finance.yahoo.com/news/matterport-delivers-innovative-solutions-built-141500920.html on Aug. 11, 2022, 9 pages (2021).
Microsoft, "Pin Power BI reports to locations in the real world (preview)," Microsoft Power BI Mobile, retrieved from https://docs.microsoft.com/en-us/power-bi/consumer/mobile/mobile-apps-data-in-space-pin-reports on Aug. 11, 2022, 14 pages (2022).
My Digital Buildings, "Le double numerique de vos batiments, cle en main [The digital double of your buildings, turnkey]," My Digital Buildings, retrieved from https://www.mydigitalbuildings.com/ on Aug. 11, 2022, 10 pages (including translation) (2022).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Open General, "Building Management System," retrieved from https://opengeneral.com/building-management-system-2/ on Aug. 11, 2022, 9 pages (2022).
PassiveLogic, "Explorer: Digital Twin Standard for Autonomous Systems. Made interactive." URL: https://passivelogic.com/software/quantum-explorer/, retrieved from internet Jan. 4, 2023 (13 pages).
PassiveLogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Porter, J., "Watch this impressive AR demo 'reset' a room using latest Apple tech," The Verge, retrieved from https://www.theverge.com/2022/7/15/23219844/shopify-augmented-reality-roomplan-api-iphone-lidar-scanner on Aug. 11, 2022, 4 pages (2022).
Quantum Alliance, "Quantum Explorer Walkthrough," 2022, (7 pages) (screenshots from video).
Results of the Partial International Search for PCT/US2018/052971, dated Jan. 3, 2019, 3 pages.
Shenhav, M., "Data in space' in preview: Now Power BI can be truly everywhere," Microsoft Power BI Blog, retrieved from https://powerbi.microsoft.com/en-us/blog/data-in-space-in-preview-now-power-bi-can-be-truly-everywhere/ on Aug. 11, 2022, 13 pages (2022).
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing Ltd., Birmingham, UK, Oct. 2014 (170 pages).
SpinalCom, "SpinalTwin Suite for BIM-O&M," SpinalCom, retrieved from https://www.spinalcom.com/en/our-solutions/spinaltwin-suite/ on Aug. 11, 2022, 2 pages (2022).
Stein, S., "Apple's AR Spaces on the new Clips app is pretty wild. iPhone 12 Pro capture w Lidar," URL: https://twitter.com/jetscott/status/1387084548341649416, retrieved from internet Nov. 29, 2022 (2 pages).
The Virtual Nuclear Tourist, "Calvert Cliffs Nuclear Power Plant," URL: http://www.nucleartourist.com/us/calvert.htm, Jan. 11, 2006 (2 pages).
Tulsi, J., "Matterport for iPhone with LiDAR Support is Here," Matterport, retrieved from https://matterport.com/blog/matterport-iphone-lidar-support-here on Aug. 11, 2022, 6 pages (2021).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Warzala, K., "The Importance of Building Automation Systems Visualization," AutomatedBuildings.com, retrieved from https://

(56) References Cited

OTHER PUBLICATIONS www.automatedbuildings.com/news/dec11/articles/dglogik/111128050101dglogik.html on Aug. 11, 2022, 3 pages (2011).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Williams, S., "IRYoutube—Indoor Reality: Mapping Indoors One Step at a Time," YouTube, retrieved from https://www.youtube.com/watch?v=7ABR8feajNA on Aug. 11, 2022, 3 pages (2017) (no audio for transcript).

Zhou, Q. et al., "Knowledge-infused and Consistent Complex Event Processing over Real-time and Persistent Streams," Further Generation Computer Systems, 2017, 76 (pp. 391-406).

* cited by examiner

BUILDING DATA PLATFORM WITH AUGMENTED REALITY BASED DIGITAL TWINS

CROSS-REFERENCE TO RELATED APPLICATION

This application claims the benefit of, and priority to, U.S. Provisional Patent Application No. 63/285,077, filed Dec. 1, 2021, the entirety of which is incorporated by reference herein.

BACKGROUND

The present disclosure relates generally to the management of building systems of a building. An augmented reality (AR) system or apparatus can be located in a space of the building. The AR system can display information pertaining to the building to a user. However, providing such information may be challenging. For example, it may be difficult to determine the location of the AR system within the building. Therefore, the information that the AR system displays may not be accurate or may not include in-depth information.

SUMMARY

One implementation of the present disclosure is a system. The system can include one or more memory devices storing instructions thereon that, when executed by one or more processors, cause the one or more processors to receive an indication of a point in a space of an environment, wherein an augmented reality system is located in the space of the environment at a coordinate in a first coordinate system. The instructions can cause the one or more processors to query a digital twin for a coordinate of the point in a second coordinate system, the digital twin including a contextual description of the environment. The instructions can cause the one or more processors to translate the coordinate of the augmented reality system in the first coordinate system to a coordinate of the augmented reality system in the second coordinate system based on the coordinate of the point in the second coordinate system and the coordinate of the augmented reality system in the first coordinate system. The instructions can cause the one or more processors to generate data to cause the augmented reality system to display information based at least in part on the translation.

In some embodiments, the point is at least one of a quick response (QR) code, a piece of art, a piece of equipment, or a feature of a building.

In some embodiments, the instructions cause the one or more processors to receive, from the augmented reality system, a coordinate of the point in the first coordinate system and translate the coordinate of the augmented reality system in the first coordinate system to the coordinate of the augmented reality system in the second coordinate system based on the coordinate of the point in the first coordinate system, the coordinate of the point in the second coordinate system, and the coordinate of the augmented reality system in the first coordinate system.

In some embodiments, the environment is a building and the space is a space of the building. In some embodiments, the point is a building object located within the space of the building. In some embodiments, the information is a description of the building space of the building.

In some embodiments, the instructions cause the one or more processors to query the digital twin for the information, the information describing the space. In some embodiments, the instructions cause the one or more processors to generate the data based on a query response of the digital twin. In some embodiments, the instructions cause the one or more processors to transmit the data to the augmented reality system to cause the augmented reality system to display a view of the space augmented with the information.

In some embodiments, the system includes an augmented reality system. In some embodiments, the augmented reality system is configured to receive the data from the one or more processors and display a view of the space augmented with the information.

In some embodiments, the instructions cause the one or more processors to receive, from the augmented reality system, an indication of an asset located within the environment, retrieve, based on the indication of the asset and the translation, a description of the asset from the digital twin, and generate the data to cause the augmented reality system to display the description of the asset.

In some embodiments, the instructions cause the one or more processors to receive, from the augmented reality system, a coordinate of an asset within the environment in the first coordinate system, translate the coordinate of the asset in the first coordinate system to the second coordinate system, and identify the asset within the digital twin based on a comparison of the coordinate of the asset in the second coordinate system and a stored coordinate of the asset in the second coordinate system stored within the digital twin.

In some embodiments, the instructions cause the one or more processors to receive an account profile of a user of the augmented reality system, determine, based on the account profile, that the user associated with the account profile has access to the information of the environment or authorization to utilize the point for the translation, and generate data to cause the augmented reality system to display the information responsive to a determination that the user has access to the information of the environment or authorization to utilize the point for the translation.

In some embodiments, the instructions cause the one or more processors to receive a set of coordinates in the first coordinate system of the augmented reality system and translate the set of coordinates of the augmented reality system in the first coordinate system to a second set of coordinates in the second coordinate system based on the coordinate of the point in the second coordinate system and the set of coordinates of the augmented reality system in the first coordinate system.

In some embodiments, the instructions cause the one or more processors to generate data to cause a user device to display a graphical representation of the space of the environment, receive, from the user device, a selection of the point in the graphical representation of the space of the environment, identify, based on the selection of the point in the graphical representation of the space of the environment, the coordinate of the point in the second coordinate system, and save the coordinate of the point in the second coordinate system in the digital twin.

In some embodiments, the system includes the digital twin including a graph data structure including nodes representing entities of the environment and edges between the nodes, the edges representing relationships between the entities. In some embodiments, the instructions cause the one or more processors to receive the coordinate of the point in the second coordinate system. In some embodiments, the instructions cause the one or more processors to identify a first node of the nodes representing the point and generate or update a second node of the nodes related to the first node by an edge of the edges to cause the second node to store or link to the coordinate of the point in the second coordinate system.

In some embodiments, the system includes the digital twin including a graph data structure including nodes representing entities of the environment and edges between the nodes, the edges representing relationships between the entities. In some embodiments, the instructions cause the one or more processors to query the digital twin for the coordinate of the point in the second coordinate system by identifying a first node of the nodes representing the point, identifying an edge of the edges relating the first node to a second node, and retrieving the coordinate of the point in the second coordinate system based on the second node.

In some embodiments, the system includes the digital twin including a graph data structure including nodes representing entities of the environment and edges between the nodes, the edges representing relationships between the entities. In some embodiments, the information describes an entity of the environment. In some embodiments, the instructions cause the one or more processors to query the digital twin for the information by identifying a first node of the nodes representing the entity, identifying an edge of the edges relating the first node to a second node representing a coordinate of the entity in the second coordinate system, determining that the coordinate of the entity in the second coordinate system indicates that the entity is within a distance from the augmented reality system, and retrieving the information of the entity responsive to a determination that the entity is within the distance from the augmented reality system.

Another implementation of the present disclosure is a method. The method can include receiving, by one or more processing circuits, an indication of a point in a space of an environment, wherein an augmented reality system is located in the space of the environment at a coordinate in a first coordinate system. The method can include querying, by the one or more processing circuits, a digital twin for a coordinate of the point in a second coordinate system, the digital twin including a contextual description of the environment. The method can include translating, by the one or more processing circuits, the coordinate of the augmented reality system in the first coordinate system to a coordinate of the augmented reality system in the second coordinate system based on the coordinate of the point in the second coordinate system and the coordinate of the augmented reality system in the first coordinate system. The method can include generating, by the one or more processing circuits, data to cause the augmented reality system to display information based at least in part on the translation.

In some embodiments, the method includes receiving, from the augmented reality system, a coordinate of the point in the first coordinate system. In some embodiments, the method includes translating, by the one or more processing circuits, the coordinate of the augmented reality system in the first coordinate system to the coordinate of the augmented reality system in the second coordinate system based on the coordinate of the point in the first coordinate system, the coordinate of the point in the second coordinate system, and the coordinate of the augmented reality system in the first coordinate system.

In some embodiments, the method includes querying, by the one or more processing circuits, the digital twin for the information, the information describing the space. In some embodiments, the method includes generating, by the one or more processing circuits, the data based on a query response of the digital twin. In some embodiments, the method includes transmitting, by the one or more processing circuits, the data to the augmented reality system to cause the augmented reality system to display a view of the space augmented with the information.

In some embodiments, the method includes receiving, by the one or more processing circuits from the augmented reality system, an indication of an asset located within the environment, retrieving, by the one or more processing circuits, based on the indication of the asset and the translation, a description of the asset from the digital twin, and generating, by the one or more processing circuits, the data to cause the augmented reality system to display the description of the asset.

In some embodiments, the method includes receiving, by the one or more processing circuits, a set of coordinates in the first coordinate system of the augmented reality system and translating, by the one or more processing circuits, the set of coordinates of the augmented reality system in the first coordinate system to a second set of coordinates in the second coordinate system based on the coordinate of the point in the second coordinate system and the set of coordinates of the augmented reality system in the first coordinate system.

Another implementation of the present disclosure is a building system. The building system can include one or more processors configured to execute instructions stored on one or more memory devices, the instructions causing the one or more processors to receive an indication of a point in a space of a building, wherein an augmented reality system is located in the space of the building at a coordinate in a first coordinate system. The instructions cause the one or more processors to query a digital twin for a coordinate of the point in a second coordinate system, the digital twin including a contextual description of the building. The instructions cause the one or more processors to translate the coordinate of the augmented reality system in the first coordinate system to a coordinate of the augmented reality system in the second coordinate system based on the coordinate of the point in the second coordinate system and the coordinate of the augmented reality system in the first coordinate system. The instructions cause the one or more processors to generate data to cause the augmented reality system to display information based at least in part on the translation.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
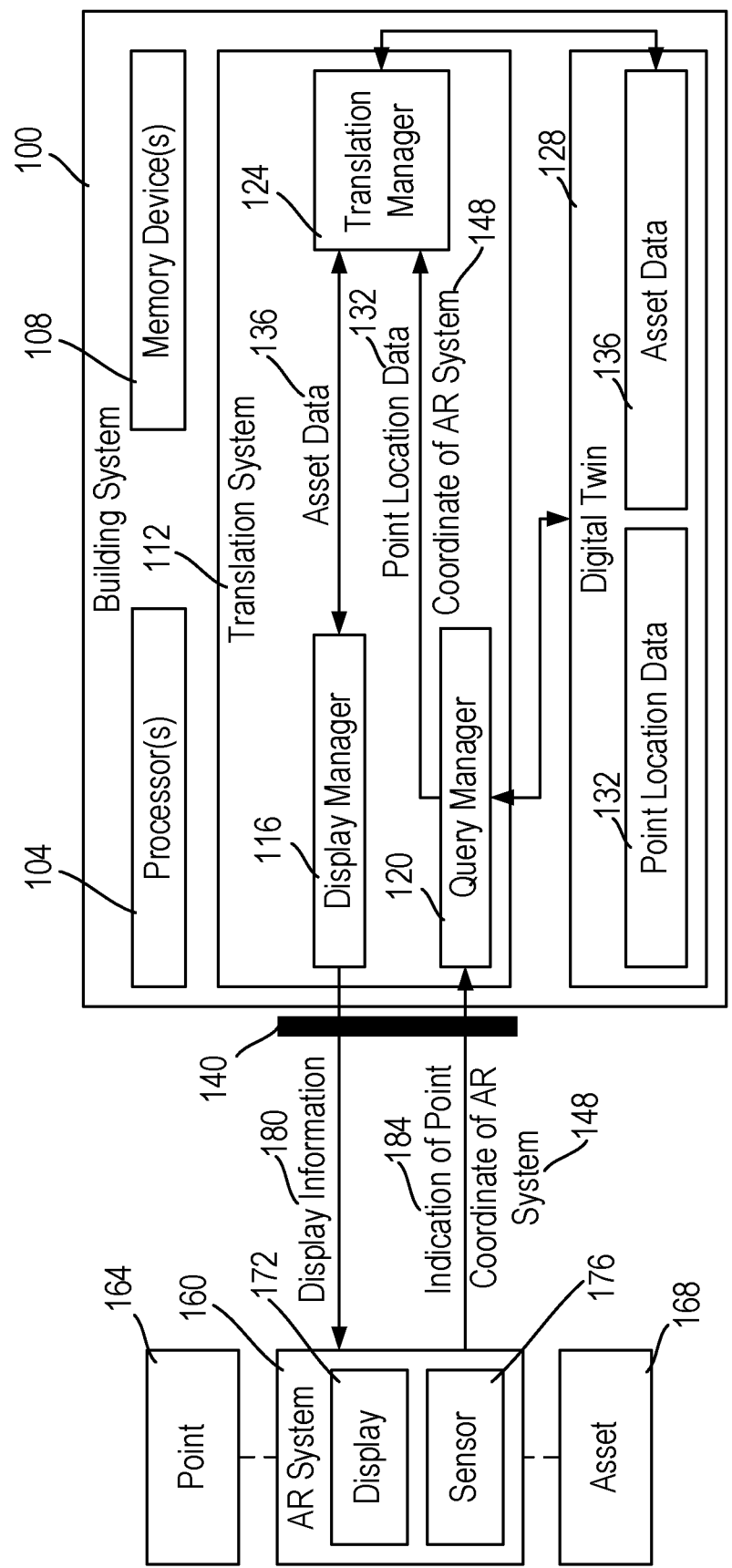
FIG. 1 is a block diagram of a building system that translates a coordinate of an AR system from a first coordinate system to a second coordinate system based on a point located with a building, according to an example.

Referring generally to the FIGURES, a building system that translates between coordinate systems for an AR system is shown, according to various exemplary embodiments. When an AR system first boots up, is activated, turned on, or otherwise enabled in a building space, the AR system can store an initial coordinate of the AR system as an origin location. As the AR system moves through the building space, the AR system can identify and store coordinates of the AR system indicating the new locations to which the AR system has moved. However, the coordinate system used by the AR system can be specific to the AR system. A coordinate system that describes the building may be different from the coordinate system of the AR system. This difference in coordinate systems used by the AR system and the building system can create technical challenges for the building system to provide information to the AR system about the spaces in which the AR system is located. For example, when there is such a difference in coordinate systems, the building system might provide inaccurate information or information that is irrelevant to the AR system or the space.

To solve these and other technical problems, the building system described herein can operate to translate at least one coordinate of the AR system (e.g., in a first coordinate system or AR system-relative coordinate system) into a coordinate of the building system (e.g., in a second coordinate system or building-relative coordinate system), using a reference coordinate of an object or point so the AR system and the building system can be operated in the same coordinate system. The point can be or include a visually distinct entity, object, area, spot, or structure. The point can be a piece of art, a piece of equipment, a quick response (QR) code, or a feature of a building (e.g., a wall, a ceiling, a staircase, etc.). A digital twin of the building system can store information of the point. The information can be a coordinate of the point in a particular coordinate system (e.g., space-relative coordinate system, building-relative coordinate system, etc.). The building system can store information of the point or the coordinate of the point in the digital twin. The building system can retrieve the point information or the coordinate of the point from the digital twin and use the coordinate of the point to translate a coordinate of the AR system (or any other entity or system) from the first coordinate system (e.g., an AR system specific coordinate system) to the second coordinate system (e.g., the building-relative coordinate system). The building system can use the translated coordinate of the AR system to cause the AR system to display building information associated with the space, point or area in which the AR system is located. The building information can include asset data, building performance, environmental conditions, etc. The translation of the building system can allow for the display of various types of information on the AR system.

The building system described herein can provide accurate and in-depth information, allowing a building manager to manage the building more consistently and efficiently. Because the building system can translate the location of the AR system into a building coordinate, the building system can provide accurate information regarding a person, an asset, or a space that is located nearby or relevant to the AR system. Furthermore, the building system can use the translated coordinates of the AR system to track the location of the AR system as the AR system moves through the building. The information that the building system provides to the AR system can include a shape, a location, or an operating status of a piece of equipment. The information can include a name, a schedule, or a role of a person. The information can include a participant list for an event occurring in the building, a duration of an event, or description of an event. This can allow a building manager to manage events and/or assets in the building, the building itself, and occupants of the building organically, while allowing a building user to have access to such various asset information without aid of building personnel.

As discussed herein, the first coordinate system can relate to a coordinate system in which an AR system captures, records, or stores coordinates or locations. The second coordinate system can relate to a coordinate system of an environment, such as a building. The second coordinate system can be an environment or building relative coordinate system. Each coordinate system may have a different origin and thus coordinates of the first and second coordinate systems that describe the same object, point, asset, or device may be different.

Referring now to FIG. 1, an example building system 100 that translates a coordinate of at least one AR system 160 from a first coordinate system to a second coordinate system based on at least one point 164 located within a building is shown. The building system 100 can be a cloud computing platform, a web-services platform, a server system, an Internet of Things (IoT) platform, an on-premises system within a building, an off-premises system outside a building, a building controller, a computing system, a desktop computer, a laptop computer, a smartphone, a console, or any other type of computing system. The building system 100 includes one or more processors 104 and one or more memory devices 108. The processors 104 can be a general purpose or specific purpose processors, an application specific integrated circuit (ASIC), one or more field programmable gate arrays (FPGAs), a group of processing components, or other suitable processing components. The processors 104 may be configured to execute computer code and/or instructions stored in the memories or received from other computer readable media (e.g., CDROM, network storage, a remote server, etc.).

The memory devices 108 can include one or more devices (e.g., memory units, memory devices, storage devices, etc.) for storing data and/or computer code for completing and/or facilitating the various processes described in the present disclosure. The memory devices 108 can include random access memory (RAM), read-only memory (ROM), hard drive storage, temporary storage, non-volatile memory, flash memory, optical memory, or any other suitable memory for storing software objects and/or computer instructions. The memory devices 108 can include database components, object code components, script components, or any other type of information structure for supporting the various activities and information structures described in the present disclosure. The memory devices 108 can be communicably connected to the processors 104 and can include computer code for executing (e.g., by the processors 104) one or more processes described herein.

The building system 100 can include a digital twin 128. The digital twin 128 can be a digital representation of a physical environment (e.g., a building, a ship, a boat, a vessel, a train, a plane, a manufacturing environment, a warehouse, a laboratory, etc.). The digital twin 128 can store contextual data of the environment and operational data of the environment. The digital twin 128 can be or include a digital replica of a physical asset (i.e., a physical device twin) and can store processes, people, places, and/or systems that can be used for various purposes. The digital twin 128 can be a software component stored and/or managed by the building system 100. The digital twin 128 can be a computing or storage entity or data structure that describes a physical thing (e.g., a building, spaces of a building, devices of a building, people of the building, equipment of the building, etc.) through modeling the physical thing through a set of attributes that define the physical thing. The digital twin 128 can include both ingested information and actions learned or executed through artificial intelligence or machine learning agents. The digital twin 128 can be or include a graph, a graph data structure, and/or artificial intelligence agents. The digital twin 128 can enable an in-depth analysis of data of the physical environment and provides the potential to monitor systems to mitigate risks, manage issues, and utilize simulations to test future solutions. The digital twin 128 can help technicians find the root cause of issues and solve problems faster, can support safety and security protocols, and can support building managers in more efficient use of energy and other facilities resources. The digital twin 128 can be used to enable and unify security systems, employee experience, facilities management, sustainability, etc.

The building system 100 can operate to communicate with an AR system 160 located in a space of the building via a network 140. The AR system 160 may include at least one processor, at least one memory device, computer hardware, at least one output device, at least one input device. For example, the hardware of the AR system 160 can be similar to the processors 104 or the memory devices 108. The AR system 160 can be located in or nearby an area of an environment (e.g., a space of the building) where the point 164 and/or assets 168 (e.g., building assets) are located. The AR system 160 can be a system, device, or apparatus that displays information to a user by augmenting, overlaying, or adding information to view of an environment. The view of the environment can be a natural view, e.g., light reflected from the environment and returned to the eyes of a user. The view of the environment can be a virtual view or captured view, e.g., a view displayed or projected to the eyes of the user based on a model or based on images or videos captured by a camera. The AR system 160 can be, include, or be embedded within, a cellphone, smart glasses, a headset, a virtual reality device, or any other user device. The AR system 160 can include a display 172 that displays information (such as the display information 180 received from the building system 100) to a user. The display 172 can be or include a liquid crystal display (LCD), a light emitting diode (LED) display, a curved mirror based display, a waveguide based display, a projector, or any other type of display device. The display 172 may include diffraction optical components, holographic optical components, polarized optical components, and reflective optical components.

The AR system 160 can include at least one sensor 176. The sensor 176 can be or include an image sensor such as a charge-coupled device (CCD) and an active-pixel sensor (e.g., complementary metal-oxide semiconductor (CMOS) sensor), a monitoring sensor such as a light detection and ranging (LIDAR) sensor, a bluetooth sensor, or a wireless beacon. In some embodiments, a LIDAR system can be used to digitize a space since it creates an accurate positioning system, e.g., it includes depth information. In some embodiments, the digital twin 128 of the building system 100 can use LIDAR and/or camera data for the points 164.

The AR system 160 can transmit, broadcast, convey, deliver, or otherwise communicate an indication of point 164 and/or a coordinate 148 of AR system 160 to the building system 100 via the via a network 140. The network 140 can be or include at least one wireless network, wired network, or combination of wireless and wired networks. The network 140 can include a Wi-Fi network, a wired Ethernet network, a ZigBee network, a Bluetooth network, and/or any other wireless/wired network. The network 140 may be a local area network or a wide area network (e.g., the Internet, a building WAN, etc.) and may use a variety of communications protocols (e.g., BACnet, IP, LON, etc.). The network 140 may include routers, modems, servers, cell towers, satellites, and/or network switches. The AR system 160 can communicate the indication 184 of point 164 or the coordinate 148 of AR system 160 as data packets, data frames, data messages, data elements, or any other type of information. A translation system 112 in the building system 100 can include at least a query manager 120. The query manager 120 can be connected to the AR system 160. The query manager 120 can be connected through the network 140. The query manager 120 can receive, collect, obtain, or get the indication 184 of point 164 or the coordinate 148 of AR system 160 from the AR system 160.

The AR system 160 can capture, generate, or identify an indication 184 the point 164 for the point 164 based on data that includes the measurements of the sensor 176 and/or based on the indication 184 of the point 164 received from the AR system 160. The data can be images of the point 164 or wireless signal strengths detected from a wireless signal emitter of the point 164. The point 164 can be or include a piece of art (e.g., a painting, a photo, a sculpture, an architecture, etc.), a piece of equipment, a feature of a building, or any visually distinct spot or area. The point 164 can be or include an asset tracking code such as a quick response (QR) code and a barcode, or a radio frequency identification (RFID). Information of the point 164 can be stored in the digital twin 128 of the building system 100, the information including point location data 132. For example, an artwork can be a point, whose coordinate, shape, and dimension can be stored in the digital twin 128.

Information of the point 164 can be stored in the digital twin 128 of the building system 100, the information including the point location data 132. The point location data 132 can be a location of the point 164 in the building or in a space of the building. The location of the point 164 can be in a Cartesian coordinate system, a circular coordinate system, a spherical coordinate system, a cylindrical coordinate system, or any other coordinate system. The location of the point 164 can include longitude, latitude, and/or altitude. The location of the point 164 can include at least one of x, y, or z values. The location of the point 164 can include at least one angle and/or at least one distance. Such coordinate systems can be relative to a certain point of the space where the point 164 is located (e.g., relative to a corner of a room where the point 164 is located) or can be relative to a certain point of the building. The point information stored in the digital twin 128 can include a shape, size, dimension, and color of the point 164. For example, the point 164 can be a sculpture, whose location, shape, size, dimension, and color can be stored in the digital twin 128.

Assets 168 can be located in a space of the building. The assets 168 may be located nearby the AR system 160 and/or the point 164. The assets 168 may be any type of building assets in the building (e.g., a building, a space, a device, a person, an equipment, etc.). Information of the asset 168 (i.e., asset data 136) can be stored in the digital twin 128 of the building system 100, the information including a shape, a size, a color, a status, an operating value, a measured value, a performance level, an energy consumption level, a performance metric, a date of maintenance, a fault status, an installation data, a model name, a model number, etc. of the asset 168. For example, a light (such as a chandelier) can be an asset, whose location, shape, and on/off status can be stored in the digital twin 128 as the asset data 136. For example, a thermostat can be the asset 168 and the asset data 136 can indicate a temperature setpoint of the thermostat, a measured temperature value of the thermostat, an equipment energy consumption associated with equipment controlled by the thermostat.

The AR system 160 can send the indication 184 of point 164 to the building system 100. The indication 184 of point 164 can be or include at least a part of the measurements of the sensor 176. For example, the indication 184 of point 164 can be an image/photo of the point 164 or an image/photo of a part of the point 164. In some embodiments, the indication 184 of point 164 can include a signal, a signal or code stored in a QR code, a signal from a barcode, or a signal from an RFID. In some embodiments, the indication 184 of point 164 can be manually entered by a building user. For example, a building user can manually indicate a nearest painting by the name of the painting, which can be a part of the indication 184 of point 164. In some embodiment, the AR system 160 can provide at least a part of a coordinate 148 of AR system 160 to the building system 100. For example, the AR system 160 may be equipped with a detection/ranging system (e.g., LIDAR), gyroscopes, etc. that detect or generate a location for the AR system 160 such that the AR system 160 can provide a location of the point 164 relative to the AR system 160 to the query manager 120 of the building system 100.

The query manager 120 can receive the indication 184 of point 164 and/or the coordinate 148 of AR system 160. The query manager 120 can analyze the indication 184 of point 164 to identify the point 164. For example, the query manager 120 can analyze the indication 184 of point 164 by running an image/pattern recognition algorithm (e.g., a convolutional neural network) to identify the indication 184 of point 164 collected by the sensor 176 (e.g., an image of an artwork captured by a camera). Based on the analysis, the query manager 120 can determine an identifier (e.g., the name of the point 164, an identification number of the point 164, a code of the point 164, etc.) associated with the indication 184 of point 164. Using the resulting identifier, the query manager 120 can query the digital twin 128 for characteristic information of the point 164 associated with the resulting identifier, the characteristic information including a dimension, a shape, a pattern, a color of the point 164, or any type of information of the point 164 that can be compared with the indication 184 of point 164. Based on the comparison between the indication 184 of point 164 and the characteristic information, the query manager 120 can determine a relative position between the AR system 160 and the point 164 (i.e., the coordinate 148 of AR system 160 in a first coordinate system). For example, the query manager can determine the distance between the AR system 160 and the point 164 by comparing the actual dimension included in the characteristic information and the dimension in the indication 184 of point 164 (e.g., a photo). For example, the query manager 120 can determine the azimuthal location of the AR system 160 in relation to the point 164 by analyzing the indication 184 of point 164 (e.g., the angle at which a photo is taken).

In some embodiments, the AR system 160 can determine the coordinate 148 of AR system 160 and provide the coordinate 148 of AR system 160 to the query manager 120. For example, the AR system can determine a coordinate of the point 164 relative to the AR system 160, using, for example, a LIDAR sensor, the coordinate of the point 164 being in the first coordinate system (i.e., AR system-relative coordinate system). This allows the AR system 160 to identify the coordinate 148 of AR system 160 in relation to the point 164. The AR system 160 can provide the coordinate 148 of AR system 160 to the query manager 120. Determining the relative position between the AR system 160 and the point 164 (the point 164 whose coordinate in the second coordinate system is stored in the digital twin 128), either by the AR system 160 or the query manager 120, can allow the building system 100 to describe the AR system 160 in the second coordinate system.

In some embodiments, the AR system 160 such as an AR headset, mobile devices such as a smartphone, or other devices may be used to generate a spatially mapped set of images of the building or spaces. In some embodiments, one or more devices for the sensor 176 may be used, optionally along with orientation data (e.g., accelerometer data), to generate an image of the space with the point 164 for various objects or image portions in the space. Once spaces are mapped, the AR system 160 can utilize the set of images to determine an accurate relative location (e.g., set of coordinates) for the AR system 160 within the space. In some embodiments, various other types of technologies may be used alone or in combination to improve the accuracy of the imaging and/or location data in the space. For example, in some embodiments, the AR system 160 may include LIDAR sensors configured to capture LIDAR data for the space. In some embodiments, the image data may be used in conjunction with other location data to determine an accurate location of objects and/or location of the AR system 160 within the space, such as Bluetooth-equipped devices configured to locate a relative or absolute location of the AR system 160 within the space. Bluetooth based location systems are described in U.S. patent application Ser. No. 17/220,795 filed Apr. 1, 2021, which is incorporated herein by reference in its entirety.

Using the resulting identifier, the query manager 120 can query the digital twin 128 for the point location data 132 associated with the resulting identifier. Upon the receipt of the query, the digital twin 128 can provide the point location data 132 (i.e., the coordinate of the point 164 in the second coordinate system or the building-relative coordinate system) to the query manager 120.

The query manager 120 can provide the point location data 132 and the coordinate 148 of the AR system 160 to a translation manager 124 of the translation system 112. The translation manager 124 can receive the point location data 132 and the coordinate 148 of the AR system 160 from the query manager 120. The translation manager 124 can determine the coordinate 148 of AR system 160 in the second coordinate system, e.g., the building-relative coordinate system. The translation manager 124 can translate the coordinate of the AR system 160 from the first coordinate system of the AR system 160 to the second coordinate system of the environment. For example, the translation manager 124 can translate the coordinate 148 of the AR system 160 from the first coordinate system to the second coordinate system based at least one of a coordinate of the point 164 in the first coordinate system (e.g., a coordinate captured by the AR system 160 or determined by the query manager 120) and a coordinate of the point 164 in the second coordinate system (e.g., a coordinate indicated by the point location data 132). This allows the building system 100 to identify a location of the AR system 160 in a coordinate system that the building system 100 uses for other building entities (e.g., point 164 or asset 168).

The translation manager 124 can query the digital twin 128 for the asset data 136 for assets associated with or located nearby the point 164 or the AR system 160. For example, the translation manager 124 can query the digital twin 128 for information about entities located nearby the AR system 160 by querying the digital twin 128 with a coordinate of the AR system 160 translated into the second coordinate system. For example, when the point 164 is located in a zone of a building that an HVAC system controls, the translation manager 124 can query the digital twin 128 for environmental conditions (e.g., temperature, humidity, air quality, etc.) measured by a sensor located in the building zone. The digital twin 128 can provide the environmental conditions to the translation manager 124 responsive to the query. The translation manager 124 can provide the asset data 136 to a display manager 116. Based on the asset data 136, the display manager 116 can generate data, such as the display information 180. The display information 180 can be a graphical user interface, a portion of the asset data 136, a metric derived from the asset data 136, a layout of the asset data 136 within the graphical user interface, etc. The display manager 116 can transmit, communicate, send, or deliver the display information 180 to the AR system 160. The display manager 116 can communicate the display information 180 to the AR system 160 via the network 140. Communicating the display information 180 to the AR system 160 can cause the AR system 160 to display information on the display 172.

The AR system 160 can receive the display information 180 from the display manager 116 of the building system 100 and display the display information 180 on the display 172. The display information 180 can be an augmented image, an overlaid image, or added information to a view of an environment. The information displayed can include at least a portion of the asset data 136, the space itself, a piece of building equipment, or a person. For example, the display information 180 can include information describing the asset 168 (e.g., a status the asset, measurements of the asset 168, an operating condition of the asset 168, a name of the asset 168, a fault the asset 168 is experiencing), information of the space where the AR system 160 is located (e.g., scheduled events, purposes of the space, temperature, etc.), information of the AR system 160 (e.g., location of the AR system in a building-relative coordinate system), or a virtual information desk. Although the display manager 116 transmits the display information 180 to the AR system 160 for display on the display 172, the AR system 160 is not limited to displaying visual information. For example, the building system 100 can cause the AR system 160 to play a sound, process data or information, communicate with one of the assets 168, control or operate the asset 168, collect data from the asset 168, etc.

In some embodiments, physical items, e.g., spaces, equipment, people, buildings, etc. can be linked via the point 164 to a virtual representation of the physical items (e.g., in a building graph). In some embodiments, based on the point 164, the building system 100 can identify where the AR system 160 is and how it is being positioned. In some embodiments, the point 164 can be used to identify and/or flag items that are missing or moved. For example, any missing objects that should be present can be flagged as missing or moved. These may be stolen items, moved furniture, broken items, etc. The sensor 176 can capture a visual image of a space and the display manager 116 can detect a missing or moved item based on a comparison between the asset data 136 and the captured image. The display information 180 can include such information so that the display 172 displays indications of the missing or moved item that the display manager 116 detects. This allows the point 164 to be used for theft or inventory alerts. In some embodiments, the point 164 can be used to display point attributes and/or label spaces. In some embodiments, the building system 100 can operate to perform asset inventory. For example, the AR system can display the asset 168 in a room on the display 172. For example, when a user walks into a room, the AR system 160 can capture images of the point 164 and/or the asset 168. For example, the building system 100 can cause the AR system 160 to display an indication of a room in which the AR system 160 is located so that a user of the AR system 160 can understand in which room the user is located. For example, the building system 100 can identify the asset 168 located nearby the AR system 160 and insert, save, or add the asset 168 into the digital twin 128 without requiring the user to provide an input that inventories the asset 168.

In some embodiments, the point 164 could be used in a building information model (BIM). For example, the building system 100 can pull information from the BIM and display the information to a building user in the AR system 160. For example, the building system 100 of the BIM can display where the AR system 160 is located in the second coordinate system. BIMs can be used in augmented or virtual reality, in some embodiments, e.g., a user could use the AR system 160 to tour a building, and the user can select a location within the BIM for information about the location, the point 164 or the asset 168. In response to such an input by a user, the AR system 160 can display the information about the space, the point 164, or the asset 168, which are automatically retrieved from the digital twin 128.

In some embodiments, using context information associated with the point 164, e.g., the context information stored (e.g., asset data 136) in the digital twin 128, the AR system 160 can further determine any of a variety of different pieces of information about the space. For example, in various embodiments, the AR system 160 can identify a purpose of the space, data about or collected from sensors in the space, people who are in the space or who are associated with the space, and events that have happened, are happening, or will be happening in the space (e.g., a schedule associated with a conference room, etc.). In some embodiments, any context information stored in the digital twin 128 could be provided to the AR system 160. The AR system 160 may use the context information to generate the visual representation of the space (e.g., displaying the information on the display 172). In some implementations, the context information or a portion thereof (e.g., sensor readings) may be displayed based on the point 164, the asset 168 located nearby the AR system 160, the location of the AR system 160, or the context information associated with the space. In some implementations, the context information may be used to augment a visual appearance of the objects within the space (e.g., to highlight a faulted piece of equipment within the space, to identify a building object within the space based on a query relating to the object, to provide a wayfinding path to a particular area within the building or space using the points 164, etc.). While the present description discusses one point (i.e., the point 164), it should be understood that, in various embodiments, any number of points may be used and stored within the digital twin(s) 128 (e.g., one or more points 164 in each space, multiple points 164 per floor, etc.). In some implementations, the number of points 164 utilized may be dependent in part on the characteristics of the space (e.g., size, number of walls, etc.).

In some embodiments, the point 164 can form a bridge between the digital twin 128 and the AR system 160. The digital twin 128 (e.g., a building graph of the digital twin 128) can be data stored for the point 164 and/or building-relative coordinates or information of the asset 168 in the building. This can allow for augmented reality for entities or the asset 168 in the digital twin 128. In some embodiments, the point 164 can help map entities of the digital twin 128 and connect the AR system 160 to the digital twin 128. For example, via the points 164, the AR system 160 could be connected to a particular building and augment a reality view with building data and/or the asset data 136 stored in the digital twin 128. For example, for a piece of equipment, the AR system 160 can be connected to a digital twin 128 of the equipment via the point 16, and a reality view can be augmented with the asset data 136 for the piece of equipment.

In some embodiments, the points 164 and/or the asset 168 may be automatically or semi-automatically identified by the AR system 160. In some embodiments, based on the identification, the building system 100 may provide relevant information to the AR system 160. For example, when a user walks into a room with an AR system 160, the AR system 160 localizes to the room, e.g., via the point 164. In some embodiments, the AR system 160 may be automatically activated when a user walks into a room. In some embodiments, a sensor 176 of the AR system 160 may automatically detect the point 164 or a signal from the point 164. For example, a smartphone localizes to the room via a bluetooth beacon data. Based on the identified location, the building system 100 can automatically identify the asset 168 associated with the identified location and communicate display information 180 to the AR system 160 so the AR system 172 displays the display information 180 or relevant information on the display 172. In some embodiments, the point 164 can be connected in various manners, including bluetooth beacon data, Wi-Fi base station data, ultra-wideband beacon data, etc.

In some embodiments, the building system 100 or a building user identifies a visually distinct spot of a physical environment and establishes the point 164 for the visually distinct spot. The user may point their device (i.e., the AR system 160) at the distinct spot (e.g., a piece of equipment, a room, a table, a computer, a sensor, etc.) to capture an image of the distinct spot, and the building system 100 stores the point location data 132 for the spot in the digital twin 128. The user may provide, via the AR system 160, a serial number, barcode, device name, room name, or any other identifying information for the distinct spot. This may link the point 164 to the virtual representation of the physical location via the information. When the AR system 160 capture a space where a visually distinct spot is located, an item whose information is unknown or is not stored in the digital twin 128 can be identified by the building system 100 and stored in the digital twin 128.

In some embodiments, the AR system 160 can capture information that a user locates, e.g., the point 164, the asset 168. For example, when a space manager locates a new table using a smartphone (i.e., the AR system 160), the table can be added to the digital twin 128 as a point 164 and/or an asset 168. The location of the table can be automatically added to the digital twin 128. For example, when a space manager locates a moved table, the updated location of the table can be added to the digital twin 128. This can reduce manual input in locating/registering the point 164 and/or the asset 168. In some embodiments, any time the AR system 160 locates and localizes on the asset 168, via the point 164, the asset data 136 can be identified and displayed (e.g., retrieved from a graph and displayed).

In some embodiments, the AR system 160 can provide a coordinate of an asset 168 in the first coordinate system (i.e., the AR system-relative coordinate system) to the digital twin 120. For example, the AR system 160 can include a subsystem (e.g., LIDAR) that can determine location information of an object and can determine the coordinate of the object in the first coordinate system. The digital twin 120 can receive the coordinate of the asset 168 in the first coordinate system, and can translate the coordinate in the first coordinate system to the coordinate in the second coordinate system. In some embodiments, the translated coordinate of the asset 168 in the second coordinate system can be stored in the digital twin 128. In some embodiments, the digital twin 128 can identify the asset 168 within the digital twin 128 based on a comparison of the coordinate of the asset 128 in the second coordinate system (i.e., the coordinate provided by the AR system 160) and a stored coordinate of the asset 168 in the second coordinate system stored within the digital twin 128. This allows for identification of an object (e.g., asset 168, point 164) based on the coordinate information.

In some embodiments, a user can perform a scan of their room with the camera of their smart phone. For example, the user can capture a 360-degree photo of a space (or multiple flat photos). The building system 100 can match the point(s) 164 in the photo(s) and attach them to correct locations of the digital twin 128. The building system 100 can label the asset(s) 168 in the photo(s) based on the point(s) 164. In some embodiments, asset inventorying and labeling can be done offline once such a panorama image is captured. The process can be automated with computer vision, in some embodiments. This also reduces technician site time.

In some embodiments, QR codes or other unique identifier may be added to a space to provide the point 164 or to be a part of the indication 184 of point 164; however, using this method requires the addition of a particular identifying element into the space. In some embodiments, the points 164 may be determined from a distinctive visual element within a space. For example, a computer vision process may determine a particular visual point within the space to use as the point 164. In some implementations, the point 164 may be shared between multiple AR systems 160 such that the multiple AR systems 160 are using the same common point 164. In some implementations, the common point 164 may be shared, for example, using a cloud service. The computer vision process may be able to represent the common point 164 in a manner such that the AR system 160 does not need to be in the same position at which the point 164 were captured, or viewing from the same angle, in order for the point 164 to be recognized by the AR system 160. Any visually distinctive element may be utilized as the point 164 for a space, such as a piece of artwork, unique device, etc.

In some embodiments, the point 164 can be private and be linked to an account. The account could be an account for a user, organization, entity, company, company team, etc. In some embodiments, a user can create and/or save the point 164 to an account or link the point 164 to the account. In this regard, only information associated with the point 164 saved to the account of a particular user may be displayed to the user. In some embodiments, when a particular user who belongs to a particular group uses the AR system 160, only information linked to the point 164 associated with the particular group may be displayed.

In some embodiments, the digital twin 128 can operate to provide augmented and/or virtual reality to the AR system 160 in a user device (e.g., a cellphone, smart glasses, a virtual reality device, etc.). The digital twin 128 can, in some embodiments, coordinate with an internal system (e.g., the same system as the digital twin 128) and/or an external system that provides the augmented or virtual reality view on the user device.

In some embodiments, the building system 100 may be configured to cause the AR system 160 to present one or more virtual agents on the display 172 of the AR system 160 to assist a user in one or more spaces of the building. For example, in some embodiments, the building system 100 may cause the AR system 160 to generate a virtual front desk agent on the display 172 of the AR system 160 that can be seen in or near a lobby of the building and can assist with tasks such as, for example, contacting an employee/occupant of the building, helping the user access the building (e.g., via credentials), helping the user find their way to a particular room or space of the building, etc. In some embodiments, the building system 100 may cause the AR system 160 to generate a supply station agent that can be displayed on the display 172 of the AR system 160 when the user is near a supply station that may, for example, help the user find building supplies. In some embodiments, the building system 100 may cause the AR system 160 to generate a maintenance agent that can be displayed, for example, when the user is near a mechanical room and may assist the user with performing maintenance tasks. In some embodiments, the agents may be visually represented as human beings or in any other visual form. In various embodiments, the visual appearance and/or functionality/capabilities of the virtual agents may be generated at least in part using information from one or more digital twins 128 of the building. For example, the virtual front desk agent may have capabilities determined, for example, based on the digital twin 128 of the lobby or other spaces of the building, the digital twin 128 of the user (e.g., indicating a role, permissions, etc. of the user), the digital twin 128 of equipment in the building, etc. In another example, the supply station agent may have capabilities determined, for example, based on the digital twin 128 of the supply station or supplies contained therein (e.g., indicating a current stock level of one or more types of supplies). In another example, the maintenance agent may have capabilities determined, for example, based on the digital twin 128 of the user (e.g., indicating a role/capabilities/knowledge of the user), the digital twin 128 of the space (e.g., the mechanical room), the digital twin 128 of the equipment in or served by the space, the digital twin 128 of other spaces of the building such as rooms/floors served by the mechanical room, the digital twin 128 of equipment in the other spaces served by the mechanical room, etc.

Figure 2:
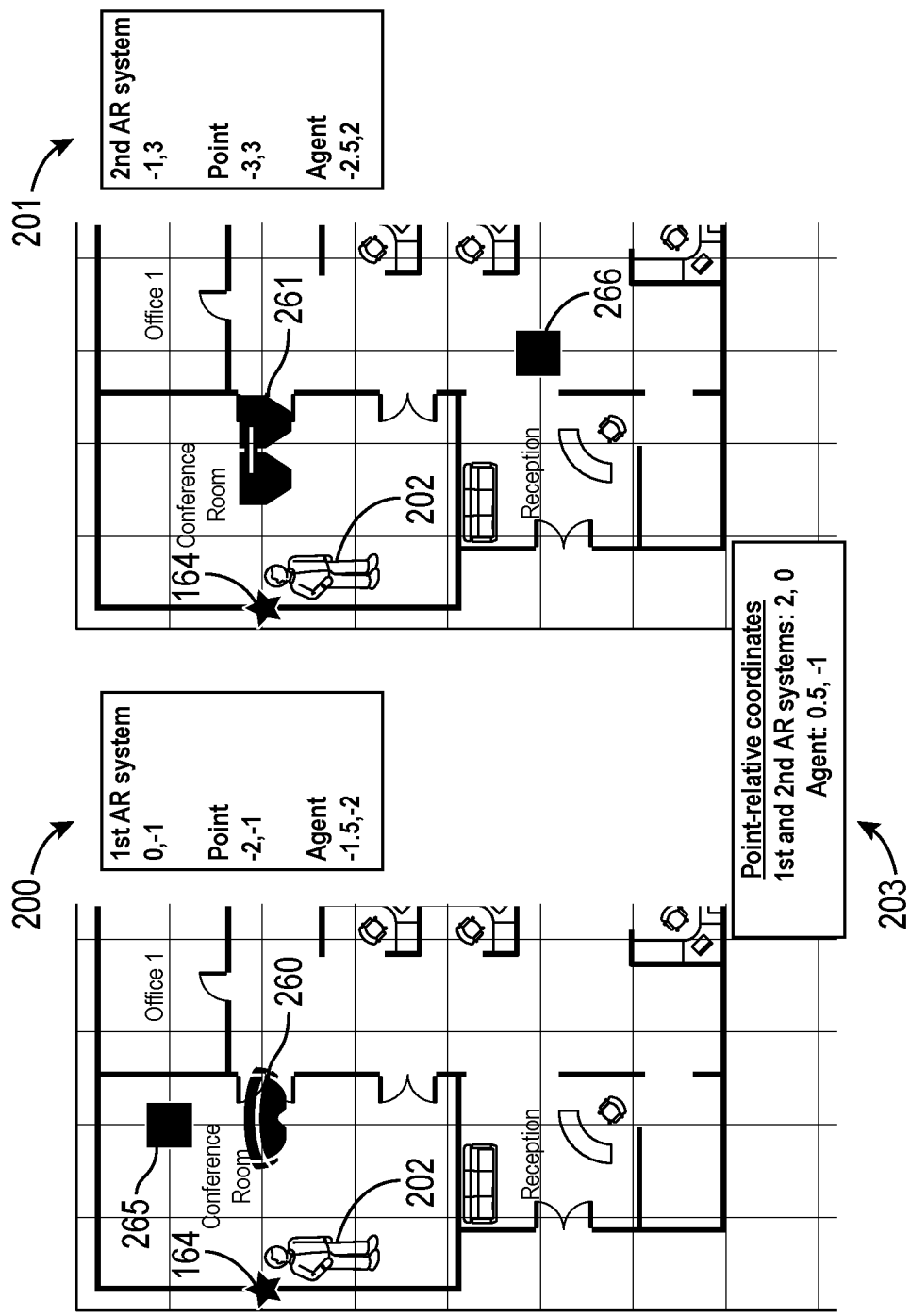
FIG. 2 depicts a building space in a coordinate system of a first AR system and a coordinate system of a second AR system, according to an example.

Referring now to FIG. 2, example building spaces 200 and 201 where a point 164, an agent 202, and AR systems 160 are located. The AR systems 160 can include a first AR system 260 in a first coordinate system and a second AR system 261 in a second coordinate system. The building spaces 200 and 201 can represent the same space including the same point 164 but with different AR systems 160 (e.g., the first AR system 260, the second AR system 261) located in the space.

A first location 265 can be a location where the first AR system 260 is activated, turned on, or otherwise enabled. A second location 266 can be a location where the second AR system 261 is activated, turned on, or otherwise enabled. Although the AR systems 260 and 261 are located at a same physical point of the space, the location of the two AR systems 260 and 261 can be described in different coordinate systems. The two AR systems 260 and 261 separately map the space and determine coordinates differently in relation to a respective physical starting location (e.g., the first location 265 and second location 266). For example, if the AR systems 260 and 261 began mapping at different points, the two AR systems 260 and 261 will represent the same actual location (e.g., the location of the agent 202) within the space using different coordinate systems. For example, the first AR system 260 is in one coordinate system where the AR system 260 is located at (0, −1), whereas the second AR system 261 is in another coordinate system where the AR system 261 is located at (−1, 3). For example, the agent 202 is located at (−1.5, −2) in the coordinate system of the first AR system 260, whereas the agent 202 is located at (−2.5, 2) in the coordinate system of the second AR system 261.

Using the point 164 as a common reference point within the space, the two AR systems 260 and 261 can be represented in a single coordinate system (e.g., a building-relative coordinate system, a point-relative coordinate system, or a space-relative coordinate system). For example, the coordinate systems can be translated to a point-relative coordinate system 203. In this case, the AR systems 260 and 261 and the agent 202 may be located at (2, 0) and (0.5, −1), respectively, in the point-relative coordinate system 203. In this manner, although the coordinates of the agent 202 within the respective coordinate systems of the separate AR system 260 and 261 are different, the coordinates can be represented in the same coordinate system (i.e., in the point-relative coordinate system 203), providing a consistent experience between the AR systems 260 and 261.

Figure 3:
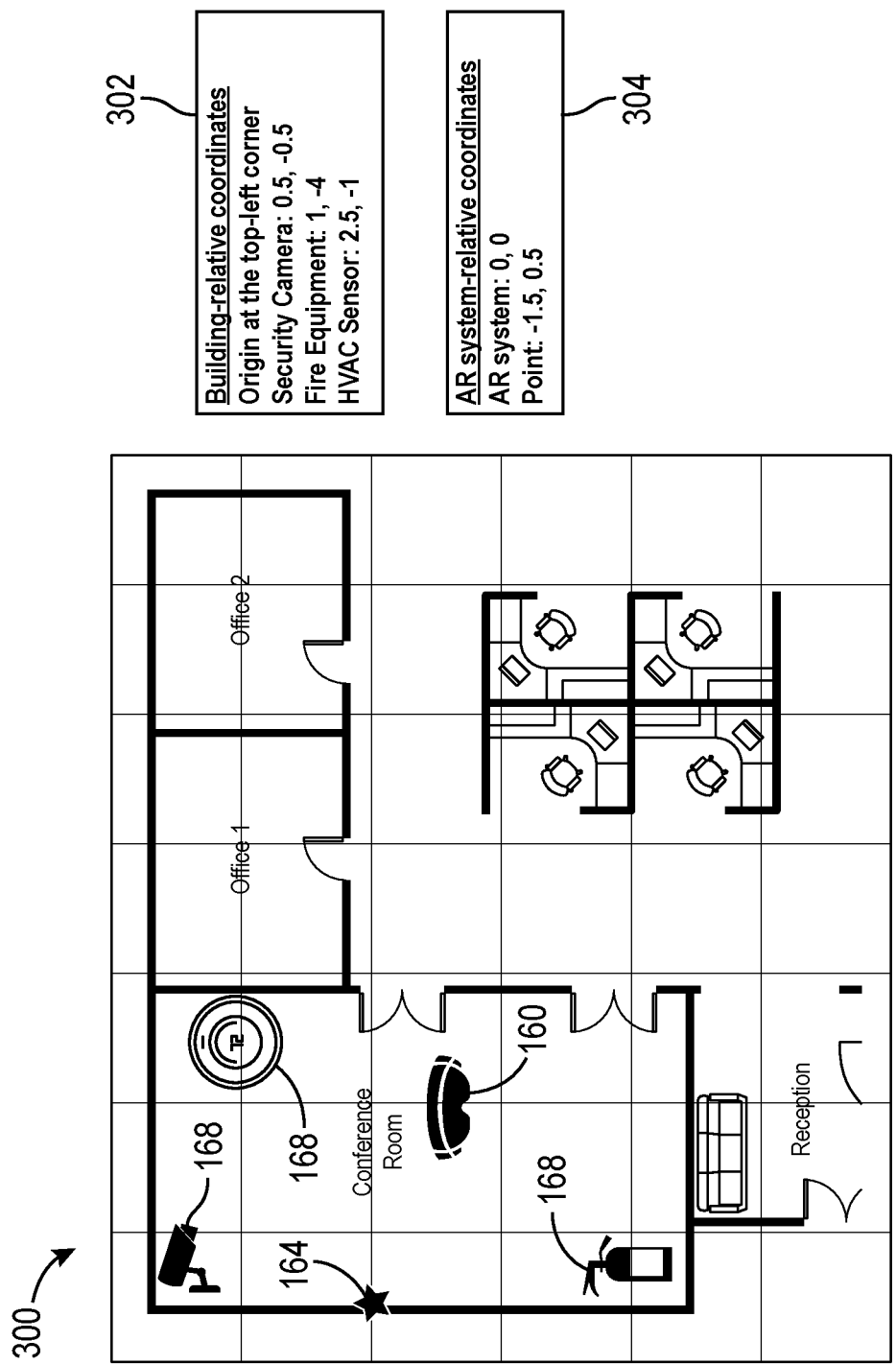
FIG. 3 depicts a building space including building assets, an AR system, and a point in a first coordinate system of the AR system and a second coordinate system of the building, according to an example.

Referring now to FIG. 3, a view of a space 300 is shown to include the AR system 160, the point 164 and the asset 168. The asset 168 can be a security camera, a fire extinguisher, and/or a thermostat. Coordinates 302 of the asset 168 in the second coordinate system (i.e., the building-relative or the point-relative coordinate system) are shown in FIG. 3, and coordinates 304 of the point 164 and the AR system 160 are shown in FIG. 3. The coordinates 302 of the assets 168 in the second coordinate system can be stored in the digital twin 128. The coordinate 304 of the AR system 160 or the point 164 in the AR relative coordinate system can be determined by the AR system 160 or the query manager 120 of the building system 100.

In some embodiments, the coordinate 304 of the AR system 160 or the point 164 can be determined by the query manager 120 of the building system 100. Once the AR system 160 provides the indication 184 of point 164 (e.g., a photo of the star shown in FIG. 3) to the query manager 120, the query manager 120 can identify the point 164 with the identifier associated with the star, and then compare the indication 184 of point 164 (e.g., the photo of the star) with characteristic information of the star (e.g., the actual dimension of the star, etc.) stored in the digital twin 128. Based on the comparison between the indication of point 164 and the characteristic information, the query manager 120 can determine a relative position between the AR system 160 and the point 164 (e.g., the star). This allows the query manager 120 to generate the coordinate 148 of AR system 160 in relation to the point 164.

In some embodiments, the AR system 160 can determine the coordinate 304 of the AR system 160 or the point 164, or can provide the query manager 120 with a part of information used to determine the coordinate 304 of the AR system 160 or the point 164. For example, the AR system can determine the coordinate of the point 164 (e.g., the star) in the first coordinate system (i.e., in relation to the AR system 160), using, for example, a LIDAR sensor. This allows the AR system 160 to determine the relative position between the AR system 160 and the point 164, thereby providing the coordinate of the point 164 (or the coordinate 148 of AR system 160) in the first coordinate system to the query manager 120.

In some embodiments, the AR system 160 or a user of the AR system 160 may provide an identifier associated with the point 164 to the query manager 120. For example, the AR system 160 may automatically or semi-automatically identify the point 164 using a pattern recognition algorithm. For example, the AR system 160 may be configured to scan a QR code and send the code to the query manager 120. For example, a user of the AR system 160 can manually enter a code or an identifier associated with the point 164. In such embodiments, the query manager 120 need not analyze the indication 184 of point 164 to find the identifier associated with the point 164.

Figure 4:
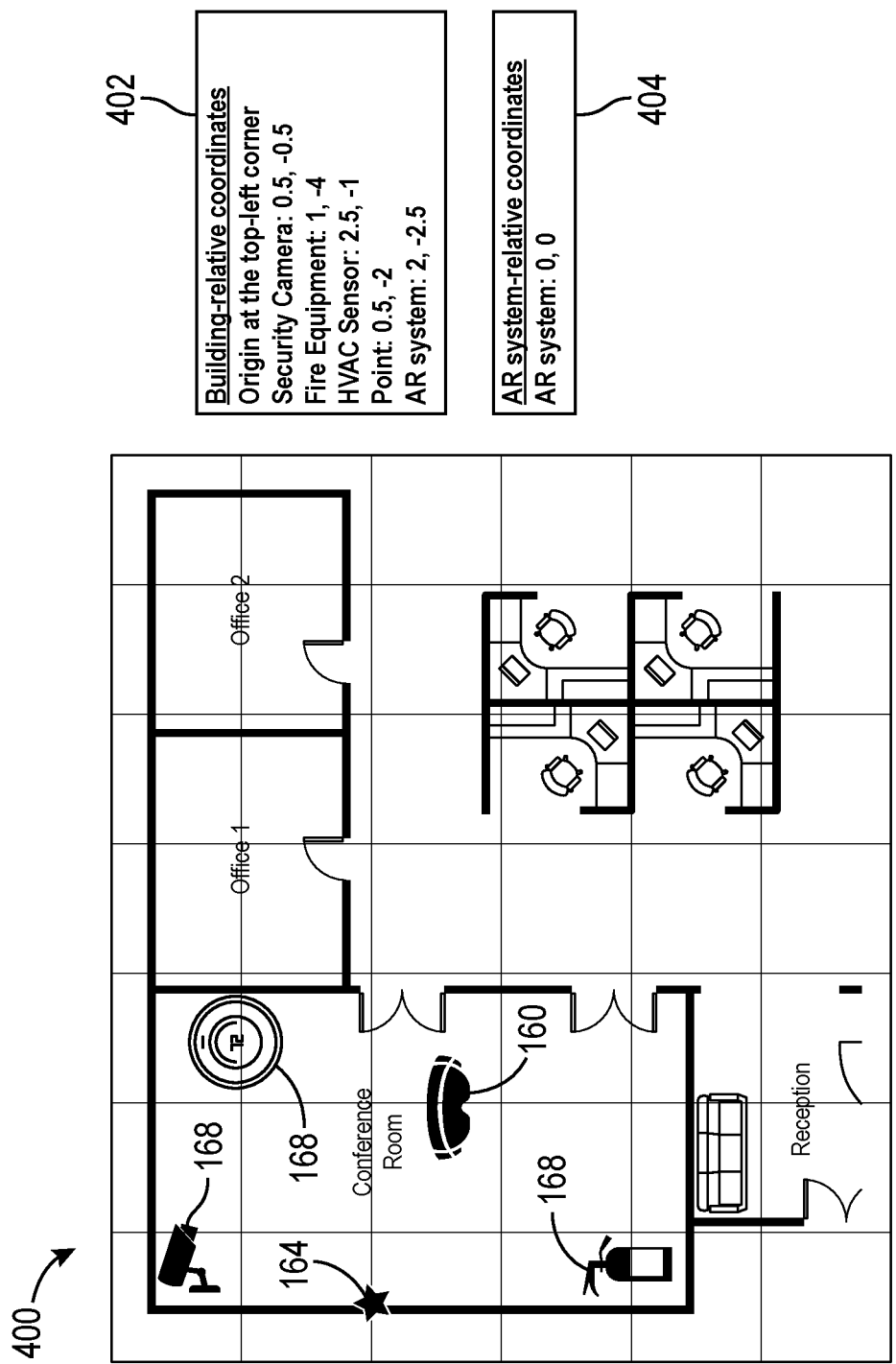
FIG. 4 depicts the building space of FIG. 3 including the building assets, the AR system, and the point translated from the first coordinate system to the second coordinate system, according to an example.

Referring now to FIG. 4, a view of the space 400 shown in FIG. 3 is shown to include the AR system 160, the point 164 and the asset 168 (e.g., a security camera, a fire extinguisher, and a thermostat). Coordinates 402 of the asset 168, the point 164, and the AR system 160 in the second coordinate system (i.e., the building-relative coordinate system) are shown. The coordinate of the point 164 in the second coordinate system can be retrieved from the digital twin 128 based on the indication 184 of point 164. For example, the AR system 160 searches the space 400 for the point 164 and captures the point 164 with the sensor 176. The AR system 160 can then provide the indication 184 of point 164 and/or the coordinate 148 of the AR system 160 to the query manager 120, which queries the digital twin 128 of the space 400 to identify the point 164 stored in the digital twin 128 with the identifiers. The building system 100 can obtain the building-relative coordinates 402 of the point 164 and determine the relationship between the AR system-relative coordinates 404 of the point 164 and the building-relative coordinates 402 of the point 164, thereby translating the coordinate 404 of the AR system 160 in the first coordinate system into the coordinate 402 of the AR system 160 in the second coordinate system.

The query manager 120 can query the digital twin 128 of the space 400 to discover other assets in the space 400 and/or other spaces and receive the building-relative coordinates 402 of the assets 168. The translation manager 124 can then translate the AR system-relative coordinates 404 (i.e., in the first coordinate system) into the building-relative coordinates 402 (i.e., in the second coordinate system) based on the relationship between the building-relative coordinate 402 and the AR system-relative coordinate 404 of the point 164. In some embodiments, the building-relative coordinates 402 of the assets 168 of a building can be stored in the digital twin 128. In some embodiments, the translation manager 124 can translate the building-relative coordinates 402 of the assets 168 (i.e., in the second coordinate system) into the AR system-relative coordinates 404 of the assets 168 (i.e., in the first coordinate system), and includes those AR system-relative coordinates in the display information 180. This allows for a user-friendly and AR system-oriented environment where the AR system 160 operates and processes data regarding the space 400, the point 164, or the asset 168 in the AR-relative coordinate system, while still being able to switch to operating in the building-relative system.

Figure 5:
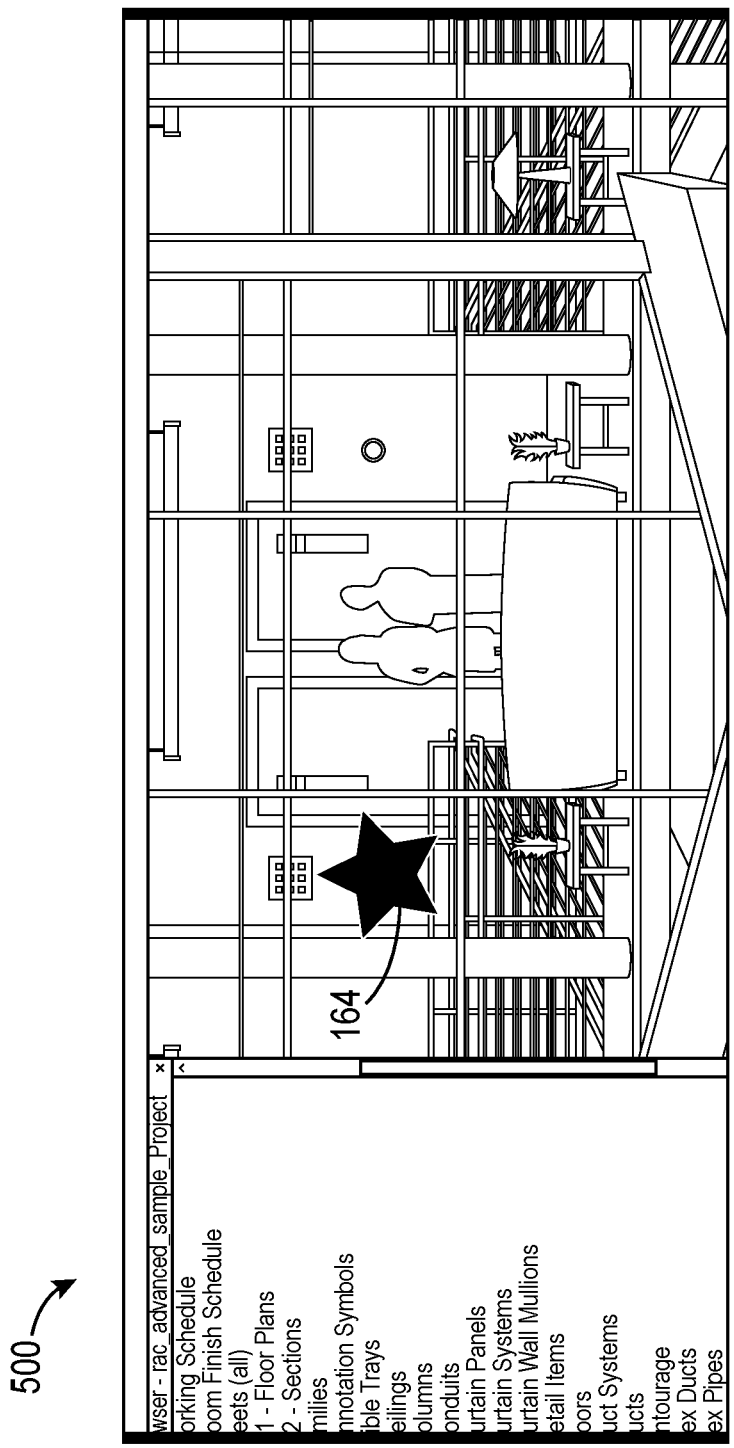
FIG. 5 is a graphical user interface of a building space where a user can select a point for translation between a first coordinate system and a second coordinate system, according to an example.

Referring to FIG. 5, a graphical user interface 500 of a building space where a user can select a point for translation between a first coordinate system and a second coordinate system. In some implementations, coordinates for various elements (e.g., points 164, assets 168) within the digital twin 128 of the building may be defined using an interface such as a Building Information Model (BIM) interface 500, which may define a 3D representation of the building and/or spaces therein. In some implementations, the BIM interface 500 may be used by a user to define various elements within the space, including the point 164, the asset 168, and locations thereof within the space. As shown in FIG. 5, the BIM interface 500 may be used to define and show the points 164 in the space. In some implementations, such as for post-construction or existing spaces, the points 164 may be placed at a location within the BIM interface 500 that is accurate to the location in which the point 164 actually appears within the space. In some implementation, such as for pre-construction spaces, the points 164 may be placed at a location within the BIM interface 500 where a physical object for the point 164 will be placed during or after construction. The location of the point 164 may be imported or ingested into the digital twin 128 of the building/space along with other building-relative coordinates. In some embodiments, any other type of interface may be used to define the building-relative coordinates of the point 164 and other building objects; the interface does not necessarily need to be a BIM interface 500.

In some embodiments, the AR system 160 can display a graphical representation of a space of an environment (e.g., a building) where a point 164 is located. In some embodiments, the AR system 160 may display a graphical representation of a space of an environment on a display 172 of the AR system 160 or on a BIM interface 500 as shown in FIG. 5. The point 164 or a graphical representation of the point 164 can be displayed in the graphical representation of the space. A building user can select the point 164 in the graphical representation of the space of the environment. The building system 100 can receive the selection of the point 164, can identify the coordinate of the point 164, and can save or update the coordinate of the point 164 in the second coordinate system in the digital twin 128. In some embodiments, an asset 168 or a graphical representation of the asset 168 can be displayed in the graphical representation of the space. A building user can select the asset 168 in the graphical representation of the space of the environment. The building system 100 can receive the selection of the asset 168. The building system 100 can identify the coordinate of the asset 168. In some embodiments, a building user can manually enter information related to the asset 168. The building system 100 can save or update the coordinate of the asset 168 in the second coordinate system and/or the asset information in the digital twin 128.

Figure 6:
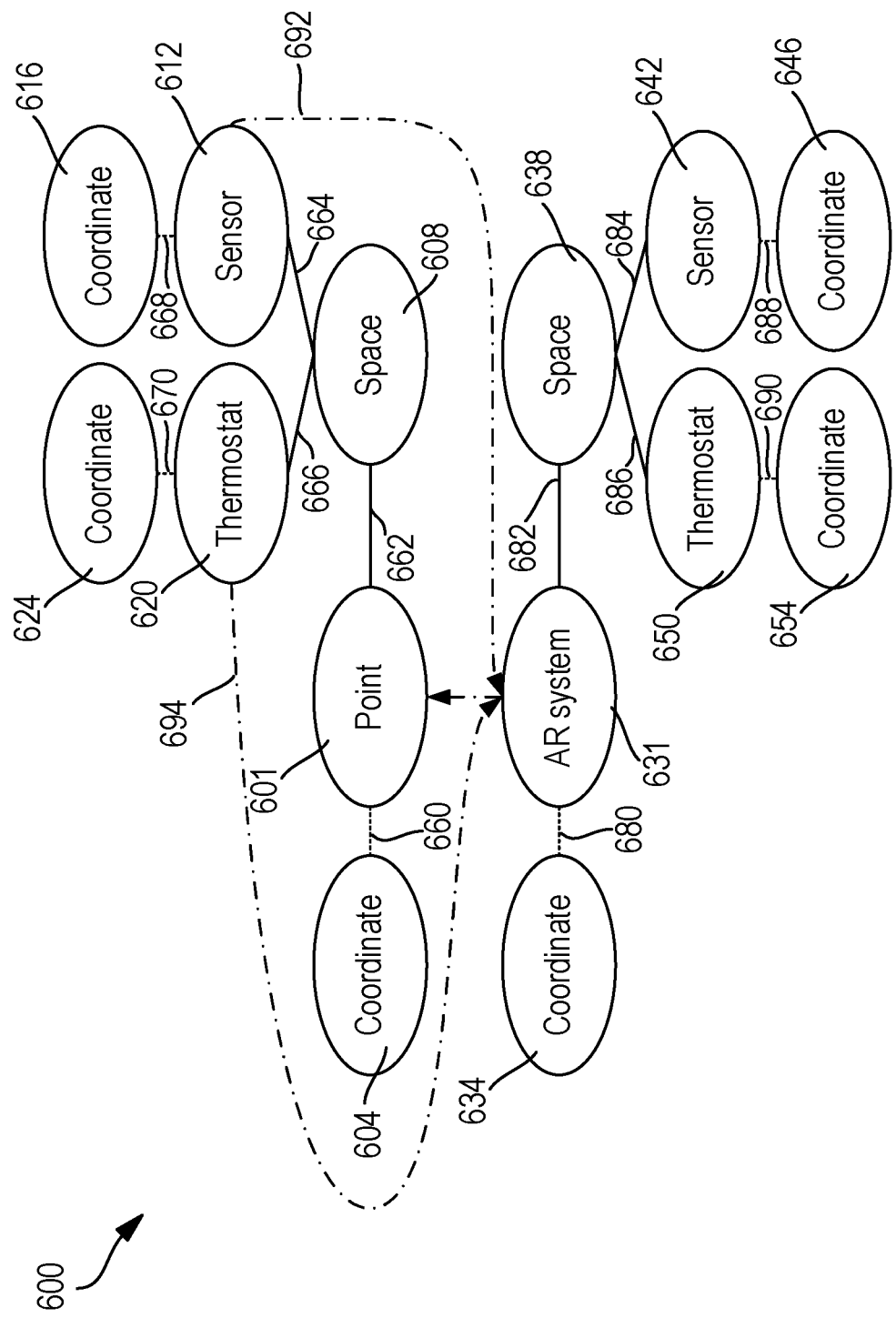
FIG. 6 is a building graph representing entities of a building and coordinates of the entities of the building, according to an example.

Referring now to FIG. 6, a graph 600 of the AR system 160 and the building system 100 where the point 164 and the asset 168 are located is shown, according to an exemplary embodiment. The graph 600 includes nodes 601-654 and edges 660-690. The node 601 represents one of the points 164, and the node 601 is linked, via the edge 660, to the node 604 that represents building-relative coordinate information of the point 164 represented by the node 601. The node 601 is linked, via the edge 662, to the node 608 that represents the space where the point 164 represented by the node 601 is located. While nodes that represent the building assets 168 may be linked to the node 608, the two nodes 612 and 620 are shown to link to the node 608, respectively via the edges 664 and 666. For example, the node 612 represents a sensor and is linked via the edge 668 to the node 616 for building-relative coordinate information of the sensor represented by the node 612. For example, the node 620 represents a thermostat and is linked via the edge 670 to the node 624 for building-relative coordinate information of the thermostat. In some embodiments, the asset nodes (e.g., 612, 620) may be linked to nodes that represent other information such as a status of the asset 168.

The node 631 represents the AR system 160, and the node 631 is linked, via the edge 680, to the node 634 that represents AR system-relative coordinate information and/or indication 184 of point 164 of the AR system 160 represented by the node 631. The node 631 is linked, via the edge 682, to the node 638 that represents the space where the point 164 represented by the node 601 and the AR system 160 represented by the node 631 are located. While a plurality of nodes that represent the building assets 168 may be linked to the node 638, the two nodes 642 and 650 are shown to link to the node 638, respectively via the edges 684 and 686. For example, the node 642 represents a sensor and is linked via the edge 688 to the node 646 for AR system-relative coordinate information. For example, the node 650 represents a thermostat and is linked via the edge 690 to the node 654 for AR system-relative coordinate information. In some embodiments, the asset nodes (e.g., 642, 650) may be linked to nodes that represent other information such as a status of the asset 168. The nodes 608, 612, 616, 620, and 624 respectively can be related to the nodes 638, 642, 646, 650, and 654. For example, data for the node 642 or 650 may be provided by the node 612 or 620 as shown as a dashed line 692 or 694.

In some embodiments, the points 164 can be used to onboard data into the building graph 600. For example, a user can use their AR system 160 to identify objects, identify physical points of interest, input information, create a point 164, etc. The building graph 600 can then provide data (e.g., point data, entity relationship data, names of entities, etc.) to the AR system 160 to augment the view in the device whenever the point 164 is triggered, e.g., display data of the graph associated with the point 164 being displayed in the view.

In some embodiments, the digital twin 128 can include a graph data structure of an environment including nodes representing entities of the environment and edges between the nodes, the edges representing relationships between the entities. Based on the coordinate of the point 164 in the second coordinate system (e.g., the building-relative coordinate system), the building system 100 (e.g., the digital twin 128) can receive the coordinate of the point 164 in the second coordinate system and can identify a first node of the nodes representing the point 164 (e.g., node 601). In some embodiments, the building system 100 can generate or update a second node (e.g., node 604) related to the first node by an edge (e.g., edge 660) to cause the second node to store or link to the coordinate of the point 164 in the second coordinate system.

In some embodiments, the digital twin 128 can include a graph data structure of an environment including nodes representing entities of the environment and edges between the nodes, the edges representing relationships between the entities. The building system 100 can query the digital twin 128 for the coordinate of the point 164 in the second coordinate system by identifying a node and an edge. For example, the building system 100 (e.g., the digital twin 128) can identify a first node (e.g., node 601) representing the point 164 and identify an edge (e.g., edge 660) relating the first node to a second node (e.g., node 604). Based on the second node, the query manager 120 can retrieve the coordinate of the point 164 in the second coordinate system.

In some embodiments, the digital twin 128 can include a graph data structure of an environment including nodes representing entities of the environment and edges between the nodes, the edges representing relationships between the entities. The building system 100 can query the digital twin 128 for the information describing an entity of the environment (e.g., a building asset). The building system 100 can query the digital twin 128 for the information by identifying a first node (e.g., node 612) representing an entity (e.g., a sensor) and by identifying an edge (e.g., edge 668) relating the first node to a second node (e.g., node 616) representing a coordinate of the entity in the second coordinate system. The building system 100 can query the digital twin 128 for the information by determining that the coordinate of the entity in the second coordinate system indicates that the entity is within a distance from the AR system 160 and retrieving the information of the entity responsive to a determination that the entity is within the distance from the AR system 160. In some embodiments, the digital twin 128 can be automatically or semi-automatically queried for the information.

Figure 7:
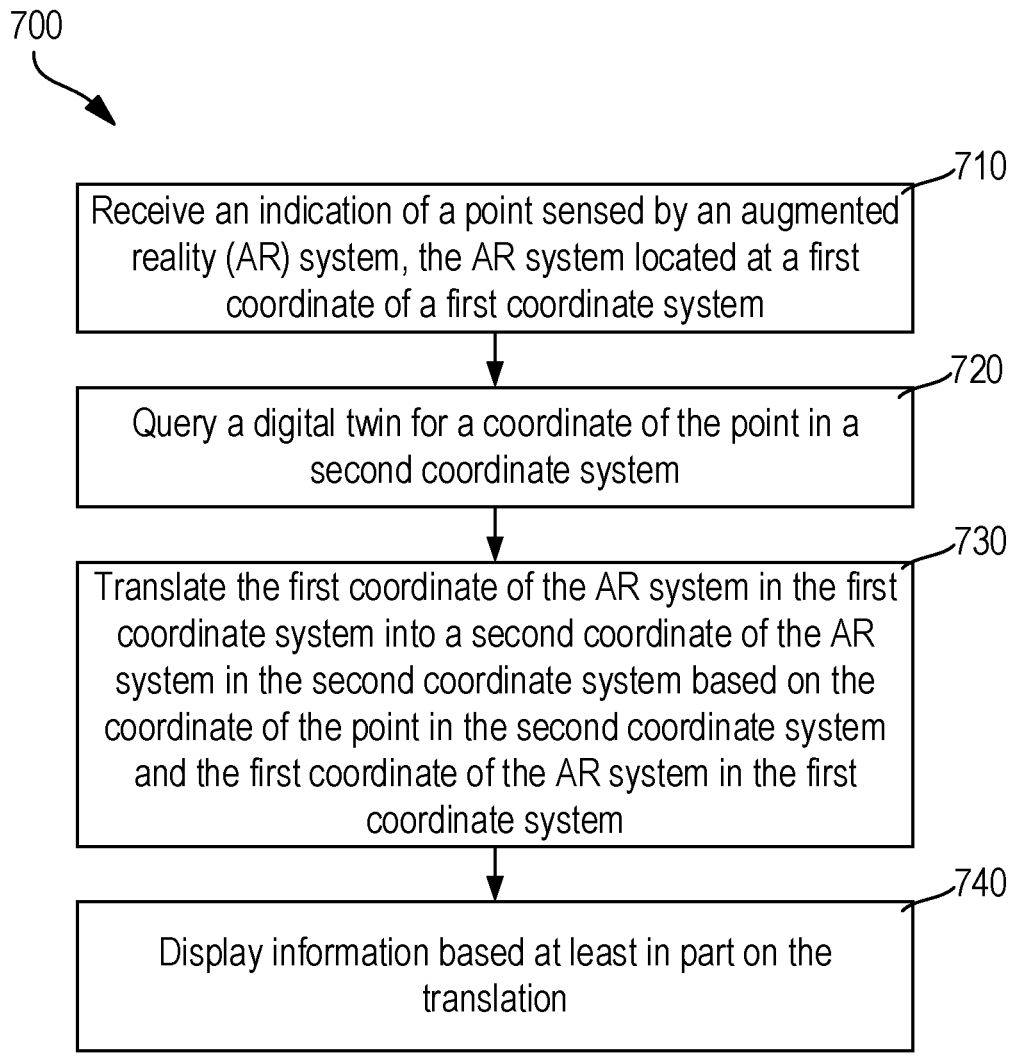
FIG. 7 is a flow diagram of a process of translating a coordinate of an AR system from a first coordinate system to a second coordinate system based on a point located with a building, according to an example.

Referring now to FIG. 7, a flow diagram of a process 700 of translating between coordinate systems is shown, according to an exemplary embodiment. At least a portion of the process 700 can be performed by the building system 100, or components of the building system 100. Furthermore, the AR system 160 can perform at least a portion of the process 700. Any computing system or device described herein can perform at least a portion of the process 700. At least one step of the process 700 can be performed by a computing system, a computing platform, a cloud platform, a server system, etc. The steps of the process 700 can be performed by a single computing system or distributed across multiple computing systems. The process 700 can perform translation from a first coordinate system (e.g., a coordinate system specific to an AR system) to a second coordinate system (e.g., a coordinate system specific to a building or building system) or from the second coordinate system to the first coordinate system. The process 700 can include a step 710 of receiving an indication of a point sensed by an AR system, the AR system located at a first coordinate of a first coordinate system. The process 700 can include a step 720 of querying a digital twin for a coordinate of the point in a second coordinate system. The process 700 can include a step 730 of translating the first coordinate of the AR system in the first coordinate system into a second coordinate of the AR system in the second coordinate system based on the coordinate of the point in the second coordinate system and the first coordinate of the AR system in the first coordinate system. The process 700 can include a step 740 of displaying information based at least in part on the translation.

The process 700 can include a step 710 of receiving the indication 184 of point 164 sensed by the AR system 160, the AR system 160 located at a first coordinate of a first coordinate system. The step 710 can include receiving, by the building system 100, the indication 188 of point 164. For example, the sensor 176 of the AR system 160 can sense, detect, or identify the point 164. The sensor 176 can capture images of the point 164. The indication 184 of the point 164 can be a set of images, a code read from a QR code, an identifier of the point 164, or any other piece of information that the sensor 176 of the AR system 160 measures, detects, captures, or generates. The AR system 160 can transmit the indication 184 of the point 164 to the building system 100, e.g., to the query manager 120. Furthermore, the AR system 160 can record, determine, or generate first coordinates 148 in a first coordinate system (e.g., a coordinate system of the AR system 160) that indicate the location of the AR system 160 in an environment.

The indication 184 of the point 164 can be or include at least a part of the measurements of the sensor 176. For example, the indication 184 of point 164 can be an image/photo of the point 164 or an image/photo of a part of the point 164. In some embodiments, the indication 184 of point 164 can include a signal (e.g., a signal from a QR code, a signal from a barcode, or a signal from an RFID). In some embodiments, the indication 184 of point 164 can be manually entered by a building user. For example, a building user can manually indicate a nearest painting by the name of the painting, which can be a part of the indication 184 of point 164. In some embodiment, the AR system 160 can provide at least a part of coordinate 148 of AR system 160 to the building system 100. For example, the AR system 160 may be equipped with a detection/ranging system (e.g., LIDAR) and provide a location of the point 164 relative to the AR system 160 to the query manager 120 of the building system 100.

The AR system 160 can transmit the coordinate 148 of the AR system 160 to the building system 100, e.g., to the query manager 120. The query manager 120 of the building system 100 can receive the indication 184 of point 164 directly or indirectly from the AR system 160. The building system 100 can communicate with the AR system 160 via one or more networks 140.

The process 700 can include a step 720 of querying the digital twin 128 for a coordinate of the point 164 in the second coordinate system. For example, the query manager 120 can use the indication 184 of the point 164 to query the digital twin 128 for the coordinate of the point 164 in a second coordinate system, e.g., a building relative coordinate system or a coordinate system used by the building system 100. The query manager 120 can generate query data, e.g., query parameters including a name of the point 164, an identifier of the point 164, an image of the point 164, a shape of the point 164, or any other identifying information of the point 164. The query manager 120 can use the query data to query the digital twin 128. The query manager 120 can receive point location data 132 from the digital twin 128 responsive to the querying. The point location data 132 can include data that describes the point 164. For example, the point location data 132 can include a coordinate of the point 164 in the second coordinate system.

In some embodiments, the query manager 120 can determine an identifier of the point 164 (e.g., the name of the point, identification number/code of the point, etc.) based on the indication 184 of point 164. The digital twin 128 can receive a query from the query manager 120 for the point 164. The query can include the determined identifier or the indication 184 of point 164. Based on the identifier or the indication 184 of point 164, the digital twin 128 can provide the point location data 132 to the query manager 120. The digital twin 128 can provide the query manager 120 coordinate information of the point 164 stored in the digital twin 128. The coordinate information including the coordinates of the point 164 in the second coordinate system.

The query manager 120 can provide the point location data 132 and the coordinate 148 of AR system 160 to a translation manager 124. In some embodiments, the step 720 can include querying, by the query manager 120, the digital twin 128 for characteristic information of the point 164 to determine a spatial relationship between the AR system 160 and the point 164. Using the determined identifier, the query manager 120 can query the digital twin 128 for characteristic information of the point 164 associated with the identifier. The characteristic information can include a dimension, a shape, a pattern, a color of the point 164. The characteristic information can include any type of information describing the point 164 that can be compared with the indication 184 of point 164. Based on the comparison between the indication 184 of point 164 and the characteristic information, the query manager 120 can determine a relative position between the AR system 160 and the point 164 (i.e., the coordinate 148 of AR system 160 in the first coordinate system or the second coordinate system). For example, the query manager can determine the distance between the AR system 160 and the point 164 by comparing the actual dimension of the point 164 included in the characteristic information and the dimension in the indication 184 of point 164 (e.g., a photo). For example, the query manager 120 can determine the azimuthal location of the AR system 160 in relation to the point 164 by analyzing the indication 184 of point 164 (e.g., the angle at which a photo is taken).

The process 700 can include a step 730 of translating the first coordinate of the AR system 160 in the first coordinate system into a second coordinate of the AR system 160 in the second coordinate system based on the coordinate of the point 164 in the second coordinate system and the first coordinate 148 of AR system 160 in the first coordinate system. For example, because the translation manager 124 has the coordinate of the point 164 in both the first coordinate system and the second coordinate system, the translation manager 124 can use the point 164 as a common reference point to translate between the first and second coordinate system. By comparing the coordinates of the point 164 in the first and second coordinate system, the translation manager 124 can map a coordinate from the first coordinate system into the second coordinate system. Similarly, the translation manager 124 can map a coordinate from the second coordinate system into the first coordinate system. The translation manager 124 can use the coordinates of the point 164 in the first and second coordinate systems to map the coordinate 148 of the AR system 160 from the first coordinate system into the second coordinate system.

In some embodiments, the translation manager 124 can perform the translation based on a spatial relationship between the AR system 160 and the point 164. For example, if the translation manager 124 can determine a vector indicating the direction and distance that the AR system 160 is located away from the point 164, the translation manager 124 can generate a coordinate for the AR system 160 in the second coordinate system. The translation manager 124 can determine the vector based on the images of the point 164 that the AR system 160 captures and data describing the physical characteristics of the point 164 stored in the digital twin 128.

The process 700 can include a step 740 of displaying the information 180 based at least in part on the translation. The display manager 116 can cause the AR system 160 to display the information 180 based at least in part on the translation performed in the step 730. The AR system 160 can receive the display information 180 from the display manager 116 via the network 140. In some embodiments, displaying the display information 180 can include displaying the display information 180 on the display 172 which can be or include a liquid crystal display (LCD), a light emitting diode (LED) display, a curved mirror based display, a waveguide based display, or any other type of display device. In some embodiments, displaying the information 180 may include projecting images (e.g., 2D or 3D models, holograms, etc.) on a visual display 172 of the AR system 160. For example, the images can be projected onto an optical projection system of the AR system 160 and/or can be projected to the display screen 172 of the AR system 160. In some embodiments, displaying information may include superimposing images over captured images (e.g., superimposing images onto a live video).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

While the techniques described herein relate to translation between coordinate systems for an AR system, the digital twin based techniques for displaying information about an environment on an AR system can be used with or without translation between coordinate systems. For example, an AR system can be programmed to utilize the coordinate system of a building and therefore, the building system may not need to perform any coordinate system translation. The building system can utilize the coordinate of the AR system in the building relative coordinate system to query the digital twin for information describing assets in an area around the AR system. The building system can generate data to cause the AR system to display the information describing the asset.

What is claimed:

1. A system, comprising:
one or more memory devices storing instructions thereon that, when executed by one or more processors, cause the one or more processors to:
receive an indication of a point in a space of an environment, wherein an augmented reality system is located in the space of the environment at a coordinate in a first coordinate system;
query, using the indication of the point, a digital twin to identify a coordinate of the point in a second coordinate system, the querying identifying a representation of the point stored in the digital twin and identifying a relationship of the digital twin connected to the identified representation of the point and extending between the coordinate of the point in the second coordinate system and the identified representation of the point stored in the digital twin, the digital twin comprising a contextual description of the environment;

translate the coordinate of the augmented reality system in the first coordinate system to a coordinate of the augmented reality system in the second coordinate system based on the coordinate of the point in the second coordinate system and the coordinate of the augmented reality system in the first coordinate system; and generate data to cause the augmented reality system to display information based at least in part on the translation.

2. The system of claim 1, wherein the point is at least one of:
a quick response (QR) code;
a piece of art;
a piece of equipment; or
a feature of a building.

3. The system of claim 1, wherein the instructions cause the one or more processors to:
receive, from the augmented reality system, a coordinate of the point in the first coordinate system; and
translate the coordinate of the augmented reality system in the first coordinate system to the coordinate of the augmented reality system in the second coordinate system based on:
the coordinate of the point in the first coordinate system;
the coordinate of the point in the second coordinate system; and
the coordinate of the augmented reality system in the first coordinate system.

4. The system of claim 1, wherein:
the environment is a building and the space is a space of the building;
the point is a building object located within the space of the building; and
the information is a description of the space of the building.

5. The system of claim 1, wherein the instructions cause the one or more processors to:
query the digital twin for the information, the information describing the space;
generate the data based on a query response of the digital twin; and
transmit the data to the augmented reality system to cause the augmented reality system to display a view of the space augmented with the information.

6. The system of claim 1, comprising:
the augmented reality system configured to:
receive the data from the one or more processors; and
display a view of the space augmented with the information.

7. The system of claim 1, wherein the instructions cause the one or more processors to:
receive, from the augmented reality system, an indication of an asset located within the environment;
retrieve, based on the indication of the asset and the translation, a description of the asset from the digital twin; and
generate the data to cause the augmented reality system to display the description of the asset.

8. The system of claim 1, wherein the instructions cause the one or more processors to:

receive, from the augmented reality system, a coordinate of an asset within the environment in the first coordinate system;
translate the coordinate of the asset in the first coordinate system to the second coordinate system; and
identify the asset within the digital twin based on a comparison of the coordinate of the asset in the second coordinate system and a stored coordinate of the asset in the second coordinate system stored within the digital twin.

9. The system of claim 1, wherein the instructions cause the one or more processors to:
receive an account profile of a user of the augmented reality system;
determine, based on the account profile, that the user associated with the account profile has access to the information or authorization to utilize the point for the translation; and
generate data to cause the augmented reality system to display the information responsive to a determination that the user has access to the information or authorization to utilize the point for the translation.

10. The system of claim 1, wherein the instructions cause the one or more processors to:
receive a set of coordinates in the first coordinate system of the augmented reality system; and
translate the set of coordinates of the augmented reality system in the first coordinate system to a second set of coordinates in the second coordinate system based on the coordinate of the point in the second coordinate system and the set of coordinates of the augmented reality system in the first coordinate system.

11. The system of claim 1, wherein the instructions cause the one or more processors to:
generate data to cause a user device to display a graphical representation of the space of the environment;
receive, from the user device, a selection of the point in the graphical representation of the space of the environment;
identify, based on the selection of the point in the graphical representation of the space of the environment, the coordinate of the point in the second coordinate system; and
save the coordinate of the point in the second coordinate system in the digital twin.

12. The system of claim 1, comprising:
the digital twin comprising a graph data structure comprising a plurality of nodes representing entities of the environment and a plurality of edges between the plurality of nodes, the plurality of edges representing relationships between the entities;
wherein the instructions cause the one or more processors to:
receive the coordinate of the point in the second coordinate system;
identify a first node of the plurality of nodes representing the point;
generate or update a second node of the plurality of nodes related to the first node by an edge of the plurality of edges to cause the second node to store or link to the coordinate of the point in the second coordinate system.

13. The system of claim 1, comprising:
the digital twin comprising a graph data structure comprising a plurality of nodes representing entities of the environment and a plurality of edges between the plurality of nodes, the plurality of edges representing relationships between the entities;
wherein the instructions cause the one or more processors to query the digital twin for the coordinate of the point in the second coordinate system by:
identifying a first node of the plurality of nodes representing the point;
identifying an edge of the plurality of edges relating the first node to a second node; and
retrieving the coordinate of the point in the second coordinate system based on the second node.

14. The system of claim 1, comprising:
the digital twin comprising a graph data structure comprising a plurality of nodes representing entities of the environment and a plurality of edges between the plurality of nodes, the plurality of edges representing relationships between the entities;
wherein the information describes an entity of the environment;
wherein the instructions cause the one or more processors to:
query the digital twin for the information by:
identifying a first node of the plurality of nodes representing the entity;
identifying an edge of the plurality of edges relating the first node to a second node representing a coordinate of the entity in the second coordinate system;
determining that the coordinate of the entity in the second coordinate system indicates that the entity is within a distance from the augmented reality system; and
retrieving the information of the entity responsive to a determination that the entity is within the distance from the augmented reality system.

15. A method, comprising:
receiving, by one or more processing circuits, an indication of a point in a space of an environment, wherein an augmented reality system is located in the space of the environment at a coordinate in a first coordinate system;
querying, by the one or more processing circuits, using the indication of the point, a digital twin to identify a coordinate of the point in a second coordinate system, the querying identifying a representation of the point stored in the digital twin and identifying a relationship of the digital twin connected to the identified representation of the point and extending between the coordinate of the point in the second coordinate system and the identified representation of the point stored in the digital twin, the digital twin comprising a contextual description of the environment;
translating, by the one or more processing circuits, the coordinate of the augmented reality system in the first coordinate system to a coordinate of the augmented reality system in the second coordinate system based on the coordinate of the point in the second coordinate system and the coordinate of the augmented reality system in the first coordinate system; and
generating, by the one or more processing circuits, data to cause the augmented reality system to display information based at least in part on the translation.

16. The method of claim 15, comprising:
receiving, from the augmented reality system, a coordinate of the point in the first coordinate system; and
translating, by the one or more processing circuits, the coordinate of the augmented reality system in the first coordinate system to the coordinate of the augmented reality system in the second coordinate system based on:
the coordinate of the point in the first coordinate system;
the coordinate of the point in the second coordinate system; and
the coordinate of the augmented reality system in the first coordinate system.

17. The method of claim 15, comprising:
querying, by the one or more processing circuits, the digital twin for the information, the information describing the space;
generating, by the one or more processing circuits, the data based on a query response of the digital twin; and
transmitting, by the one or more processing circuits, the data to the augmented reality system to cause the augmented reality system to display a view of the space augmented with the information.

18. The method of claim 15, comprising:
receiving, by the one or more processing circuits from the augmented reality system, an indication of an asset located within the environment;
retrieving, by the one or more processing circuits, based on the indication of the asset and the translation, a description of the asset from the digital twin; and
generating, by the one or more processing circuits, the data to cause the augmented reality system to display the description of the asset.

19. The method of claim 15, comprising:
receiving, by the one or more processing circuits, a set of coordinates in the first coordinate system of the augmented reality system; and
translating, by the one or more processing circuits, the set of coordinates of the augmented reality system in the first coordinate system to a second set of coordinates in the second coordinate system based on the coordinate of the point in the second coordinate system and the set of coordinates of the augmented reality system in the first coordinate system.

20. A building system, comprising:
one or more processors configured to execute instructions stored on one or more memory devices, the instructions causing the one or more processors to:
receive an indication of a point in a space of a building, wherein an augmented reality system is located in the space of the building at a coordinate in a first coordinate system;
query, using the indication of the point, a digital twin to identify a coordinate of the point in a second coordinate system, the querying identifying a representation of the point stored in the digital twin and identifying a relationship of the digital twin connected to the identified representation of the point and extending between the coordinate of the point in the second coordinate system and the identified representation of the point stored in the digital twin, the digital twin comprising a contextual description of the building;
translate the coordinate of the augmented reality system in the first coordinate system to a coordinate of the augmented reality system in the second coordinate system based on the coordinate of the point in the second coordinate system and the coordinate of the augmented reality system in the first coordinate system; and generate data to cause the augmented reality system to display information based at least in part on the translation.

* * * * *